R. S. BROWN.
CHUCK.
APPLICATION FILED SEPT. 28, 1917.

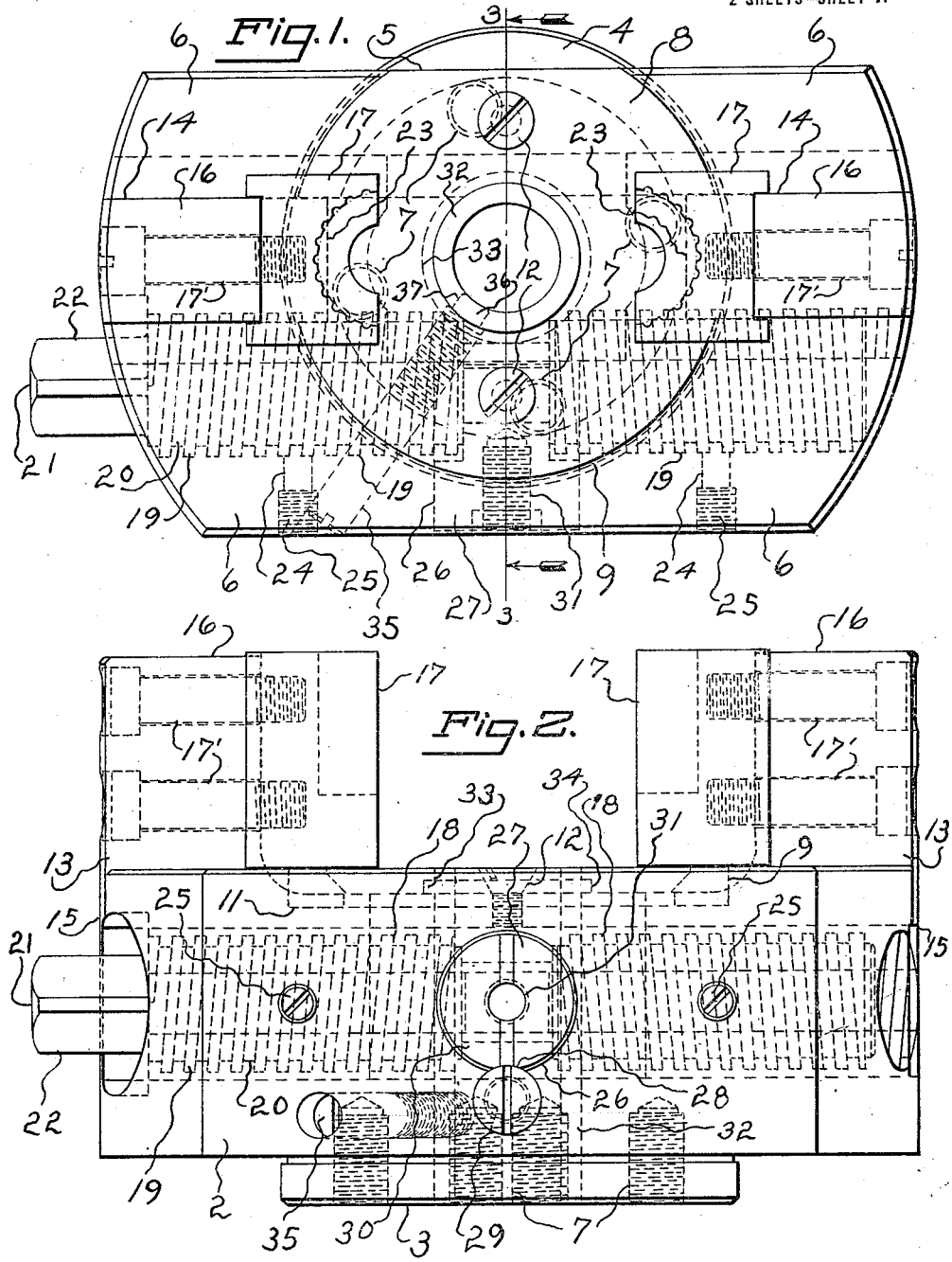

1,272,614.

Patented July 16, 1918.
2 SHEETS—SHEET 2.

Inventor
R. S. Brown
By Heith Suthwood
Attorney

UNITED STATES PATENT OFFICE.

ROBERT S. BROWN, OF NEW BRITAIN, CONNECTICUT, ASSIGNOR TO THE NEW BRITAIN MACHINE COMPANY, OF NEW BRITAIN, CONNECTICUT, A CORPORATION OF CONNECTICUT.

CHUCK.

1,272,614. Specification of Letters Patent. Patented July 16, 1918.

Application filed September 28, 1917. Serial No. 193,639.

*To all whom it may concern:*

Be it known that I, ROBERT S. BROWN, a citizen of the United States, residing at New Britain, in the county of Hartford and State of Connecticut, have invented certain new and useful Improvements in Chucks, of which the following is a specification.

This invention relates to chucks. A chuck involving the invention can obviously be used with advantage in various connections, although it is of particular utility, however, when forming part of a metal working machine, being intended in this case to be fastened suitably to a face plate or other supporting part and being operative for holding the work while being acted upon by a tool or tools. As may be clear, the appliance may serve to hold a tool. One of the fundamental purposes I have in view is to provide an article of the character set forth, which will possess adequate strength and which has means of a positive nature to resist torsional and like effects. Another motive I have in mind is to prevent as far as possible, the entrance of chips, cuttings and other foreign matter into the inside of the device. I also provide a construction by which a drill, boring tool or other part can be passed if necessary through or piloted in and guided by the chuck. The latter possesses other features of novelty and advantage which with the foregoing will be set forth at length in the following description, wherein I will describe in detail that form of embodiment of the invention which I have selected for illustration in the drawings accompanying and forming part of the present specification.

Referring to said drawings:

Figure 1 is a front elevation of a chuck involving the invention.

Fig. 2 is a top plan view of said chuck.

Like characters refer to like parts throughout the several views.

Figure 3:
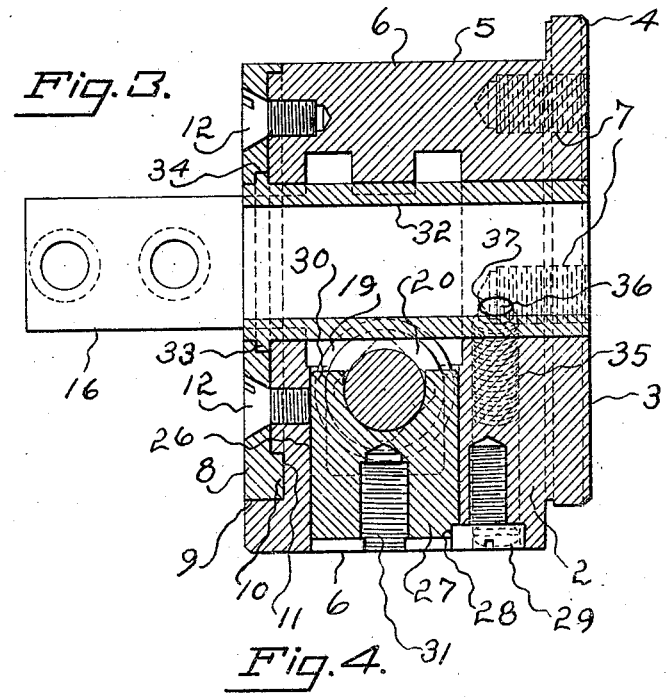
Fig. 3 is a vertical section on the line 3—3 of Fig. 1, looking in the direction of the arrows, but with the slip jaws and holding means omitted.
Figure 4:
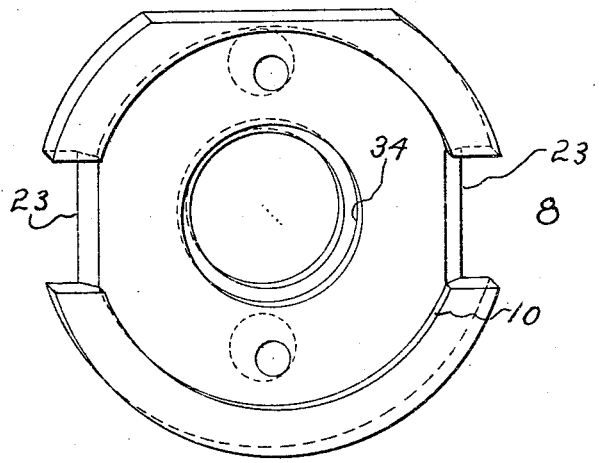
Fig. 4 is an isometric perspective view of a reinforcing element.

The chuck involves in its construction a body as 2, from the rear face of which protrudes the extension 3 which projects slightly as at 4 from what is shown as the upper approximately flat face 5 of the body. This body is furnished with complemental forwardly-extending projections 6, the inner faces of which are spaced apart. The result of this is that the body with its projections is practically U-shaped in cross section. The body as shown has one or more tapped holes as 7 to receive screws by which the chuck can be fastened to a face plate or other suitable sustaining element. I have spoken of the upper surface 5 as being flat. This is merely the upper surface, because the chuck is so shown in the drawings. It will be evident that I do not restrict myself to its positioning in any particular manner, because there may be cases where the face 5 would stand vertically or otherwise.

It will be understood that the front portions of the complemental projections 6 are spaced, and I provide means for bridging across the free ends of these projections to thus materially reinforce the appliance at the place mentioned. Within certain limits, this means may vary, although the plate or disk 8 meets my conditions in a satisfactory manner. Said plate or disk 8 as may be inferred is illustrated as circular, although as will be hereinafter explained, it is not a full circle, nor need it be imperatively of the form specified. The front faces of the projections of arms 6 have recesses 9 in which the reinforcing member, plate or disk 8 is set, the walls of the two recesses effectually preventing lateral movement of the plate or disk. The upper recess or seat 9 is intersected by the plane of the upper surface 5 of the body and upper projection 6. The plate or disk 8 has for additional security the rearwardly extending beads 10 which fit in grooves or channels 11 on the front portion of the projections or arms 6. The front flat face of the plate or disk 8 is in the plane of the front faces of the two projections 6. To securely hold the disk or plate 8 in position, any suitable means may be provided, the screws 12 being shown for this purpose and being threaded into tapped holes in the front ends of the projection 6, their practically conical heads being countersunk in openings in the disk. This construction is an exceedingly rigid one and prevents in an effective manner the disagreeable effects due to torsion.

There are two jaws 13, the chuck body 2 having transverse ways 14 to receive the respective jaw bodies 15, said jaws being movable toward or from each other practically radially of the chuck. From the bodies 15 there extend forwardly the jaw portions 16 which are adapted to hold when set, a piece of work or the like, so as to hold the same solidly during a predetermined action. The jaw portions 16 may as shown have fitted to them the slip jaws 17 held in position in a substantial yet removable manner for instance by several screws 17' threaded thereinto and extending through openings in said jaw portions. The bodies 15 of the two jaws are provided on their inner sides with opposite threads as 18 which receive the opposite threaded portions 19 of the screw 20 extending crosswise of the chuck body 2. This screw may be operated in any desirable manner, for instance and as shown its projecting end 21 may be provided with a suitably shaped head as 22 to receive a wrench to effect the rotation of the screw and thus the movement of the jaws 13 toward or from each other. As shown the reinforcing plate or disk 8 has diametrically opposite notches or slots 23 which are adapted to receive the butts of the jaw portions 16 when said jaw portions occupy their innermost adjustment or practically so. It will be clear that the plate or disk 8 effectually prevents springing apart of the projections 6 and also prevents any inaccurate centering of the work clamped between the jaws 13. The lower projection 6 as shown in Fig. 1 for example may have openings 24 to receive oil or other suitable lubricant, the openings normally being closed by plugs or screws as 25 threaded into the outer portions of the openings 24. I have mentioned the fact that the chuck body 2 has ways to receive the bodies of the jaws 13. These ways are presented by the spaces between opposing walls of the projections 6 to which I have already referred.

The lower projection 6 practically midway of its ends has an opening 26 to receive the plug 27, said plug as shown being approximately cylindrical and having a marginal notch 28 at its outer end to receive the head of the screw 29 tapped into the body of the chuck. The screw, therefore, presents a convenient means for holding the plug 27 in position. This plug constitutes a desirable means for maintaining the two jaws and their operating screws at all times in proper position. The plug or cylinder 27 is in fact provided with a reduced head portion 30 at the inner or upper end to be abutted at all times by the two parts of said screw portion. The plug 27 may as shown have a tapped hole as 31 to receive a suitable screw to facilitate the removal of the plug when it becomes necessary to take it out, it being of course, necessary to remove the holding screw 29 prior to this particular proceeding.

From the extreme front to the very back of the chuck there extends a tube 32 constituting a suitable guard to prevent chips, cuttings or the like entering inside the chuck. The rear end of the tube is flush with the back of the chuck body, while the front end thereof is in the plane of the disk 8. This tube is provided with a circumferential flange 33 near its forward end to fit a rabbet 34 in the rear of the disk 8 to thus tend to prevent endwise movement of the protective tube. For further security the lower projection 6 may have threaded through it the holding screw 35, the reduced end 36 of which projects into an opening 37 in the tube near the rear end thereof. In this manner all accidental movement of the tube is effectually and positively prevented. The tube, as will be clear, acts as an effective barrier to prevent foreign matter getting into the inside of the chuck.

The tube 32 also acts as an efficient support for the pilot end of a boring or other tool, the result being that the tool is positively maintained in the exact center of the work. It will be apparent, therefore, that while it is desirable that the tube be imperforate, this may not be the construction in all cases.

What I claim is:

1. A chuck comprising a body having separate projections, a plate bridging the projections, a tube connected with the body extending between the projections, and constituting a support for the pilot end of a tool; the plate being provided with means to clamp the tube against the projections, and two diametrically opposite jaws carried by the body, the latter being provided with a rotary screw furnished with oppositely threaded portions, the jaws being provided with oppositely threaded portions to receive the corresponding portions of the screw and the work gripping parts of the jaws extending outwardly beyond the face plate.

2. A chuck comprising a body provided with projecting means, a plate fitted against the projecting means, a tube connected with the body, and constituting a support for the pilot end of a tool, the plate being provided with means to clamp the tube against the projections, and diametrically opposite jaws carried by the body, the latter being provided with a rotary screw furnished with oppositely threaded portions, the jaws being provided with oppositely threaded portions to receive the corresponding portions of the screw and the work gripping parts of the jaws extending outwardly beyond the face plate.

3. A chuck comprising a body having separate projections, a plate bridging the projections, a tube connected with the body, extending between the projections, and constituting a support for the pilot end of a tool, the front end of the tube having an external bead, and the plate having a rabbet on its inner side to receive the bead and thus bind the same against the projections, and jaws carried by the body, the latter being provided with means for effecting the action of the jaws.

4. A chuck comprising a body having separate projections, a plate bridging the projections, screws for holding the plate to the projections, a tube connected with the body, and extending between the projections, the plate having a rabbet on its inner side and the tube having a bead to fit said rabbet, whereby the plate will press the bead against the projections, and jaws carried by the body, the latter being provided with means for effecting the action of the jaws.

5. A chuck comprising a body having separate projections, a plate bridging the projections, a tube connected with the body extending between the projections, the plate having means to engage a part of the tube to force said tube part against the projections, means carried by the body and engaging the tube to prevent rotation thereof, and jaws carried by the body, the latter being provided with means for effecting the action of the jaws.

In testimony whereof I affix my signature in the presence of two witnesses.

ROBERT S. BROWN.

Witnesses:
H. H. PEASE,
HEATH SUTHERLAND.

Copies of this patent may be obtained for five cents each, by addressing the "Commissioner of Patents, Washington, D. C."